Sept. 9, 1930.  W. H. BONEHILL  1,775,086
COMBINATION SCISSORS AND PLIERS
Filed Feb. 7, 1929
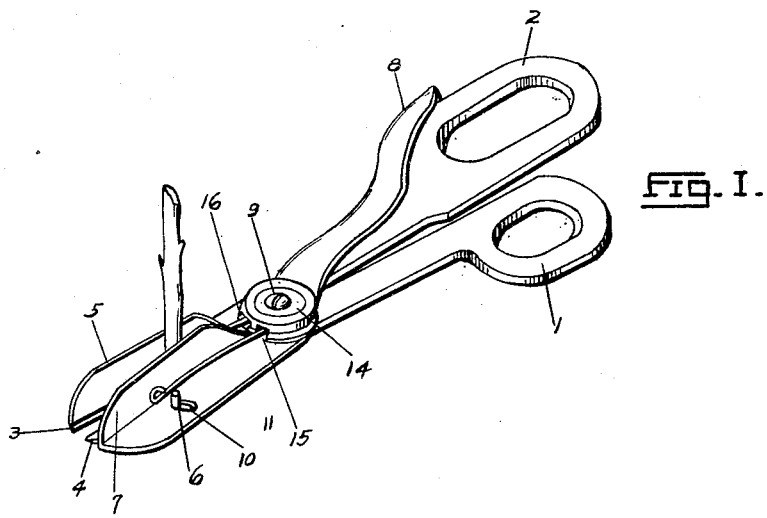
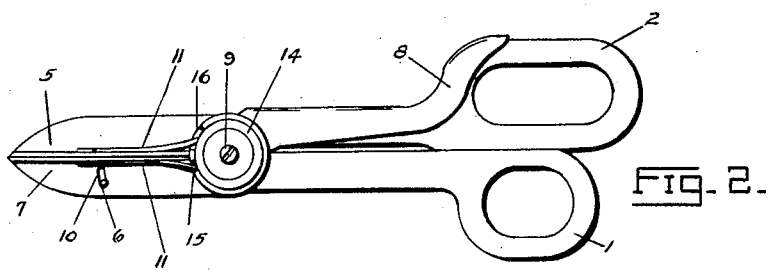
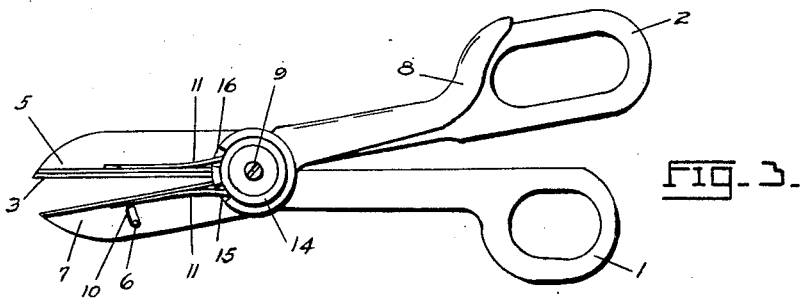
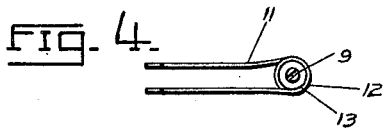
Inventor
WALTER HENRY BONEHILL
By *Franx Keipler*
Attorney Patented Sept. 9, 1930

1,775,086

UNITED STATES PATENT OFFICE

WALTER HENRY BONEHILL, OF ROCHESTER, NEW YORK

COMBINATION SCISSORS AND PLIERS

Application filed February 7, 1929. Serial No. 338,237.

The object of this invention is to provide a combination of cutters or scissors and pliers that can be used more especially for cutting flowers and which will not only cut the stems of the flowers from the bush, but will also grip and hold the stem of the flower as it is drawn away from the bush. With this tool flowers can be cut with one hand and removed from the pliers with the other hand after it is drawn away from the bush leaving the other hand free in the meantime for any other useful purpose.

Another object of the invention is to make the tool in such a way that any desired pressure may be put on the stem of the flower that has been cut.

These and other objects of the invention will be illustrated in the drawings, described in the specification and pointed out in the claims at the end thereof.

In the drawing:

Figure 1 is a perspective view of the tool with the flower stem clamped between the jaws thereof.

Figure 2 is a top plan view of the tool with the jaws closed.

Figure 3 is a top plan view of the tool with the blades and the jaws open.

Figure 4 is a detail view of the spring which gives an independent movement to one of the jaws, together with the bushing and screw by which it is held in place.

In the drawings like reference numerals indicate like parts.

In the drawings is illustrated a pair of shears or snips made of two members in the ordinary way having handles 1 and 2 on one end thereof and cutting blades 3 and 4 on the other end thereof. Rigidly fastened integral on the blade 3 is the jaw 5 of the pliers. Rigidly mounted on the blade 4 is the pin 6. The jaw 7 with its extension handle 8 is pivotally mounted on the screw or rivet 9 which joins the two members of the shears together and this jaw has a limited swinging movement or lost motion on the cutting blade 4. For this purpose it is provided with a slot 10 that is concentric with the center 9. The jaws 5 and 7 are normally pressed together by the U shaped spring 11 which is formed with a loop 12 therein which loop embraces a sleeve 13 that is centered on the screw 9. This spring 11 normally holds the jaws 5 and 7 together, when the shears are closed as shown in Fig. 2 and holds the jaw 7 in the position shown in Fig. 3 when the shears are open. The spring 11 and hub 13 are held in place by means of the cap 14 which has a small opening 15 on the one side thereof and an elongated opening 16 on the other side thereof through which openings pass the two sides of the spring 11. All the parts are held together and in place at the hub by means of the screw 9.

In operation the shears are opened to the position shown in Fig. 3 and the blades are caused to cut through the stem. As the shearing is completed the jaws 5 and 7 close on the stem and the jaw 7 yields to the position shown in Fig. 1 clamping the stem and holding it, while the blades complete the cutting and close to the normal position shown in Fig. 2, the jaws remaining apart to accommodate the thickness of the stem that has been cut with the stem securely clamped between them. The pressure of the jaws on the stem can be increased by the operator pressing on the handle 8 with one finger which will cause the movable jaw to be pressed toward the stationary jaw, thus increasing the pressure on the stem. The stem may be held in this way while the flower is being withdrawn from the bush and when the shears are opened, the stem of the flower is released therefrom. This makes it possible to cut flowers with the right hand without putting the left hand into the rose bush to hold onto the flower stem while it is being cut and makes the cutting of flowers much safer and easier, especially from thorny bushes.

I claim:

1. A pair of shears having two members, a pivot member by which they are suitably pivoted together, each member being provided with a cutting blade and cutting edge at one end and a handle at the other end, a clamping jaw rigidly fastened to one of the cutting blades and a clamping jaw yieldingly mounted on the other blade and pivoted on the pivot member of the shears, a U shaped spring engaging the two clamping jaws and the pivot and tending to normally hold the clamping jaws together.

2. A pair of shears having two members, a pivot member by which they are suitably pivoted together, each member being provided with a cutting blade and cutting edge at one end and an enclosed handle at the other end, a clamping jaw rigidly fastened to one of the cutting blades and a clamping jaw yieldingly mounted on the other blade and pivoted on the pivot member of the shears, a handle on said last named clamping jaw extending beyond the pivot so as to be placed adjacent to the handle of the member on which the jaw is mounted so as to be operated with or independent of that member of the shears. A spring engaging the yielding jaw and adapted to normally move it toward the rigid jaw.

3. A pair of shears having two members, a pivot member by which they are suitably pivoted together, each member being provided with a cutting blade and cutting edge at one end and a handle at the other end, a clamping jaw rigidly fastened to one of the cutting blades and a second clamping jaw, yieldingly mounted on the other blade, a slot in said jaw, a pin in said blade which engages with said slot and limits the movement of the jaw on the blade, said jaw being pivoted on the pivot member of the shears, a U shaped spring engaging the two clamping jaws and the pivot and tending to normally hold the clamping jaws together.

In testimony whereof I affix my signature.

WALTER HENRY BONEHILL.